Feb. 14, 1928. 1,658,843
F. GRAY
MODULATING SYSTEM
Filed Oct. 6, 1925
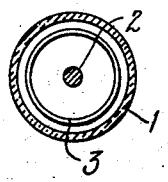
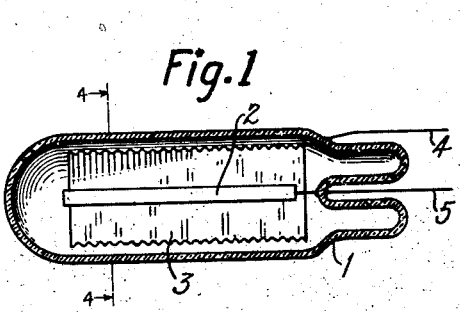
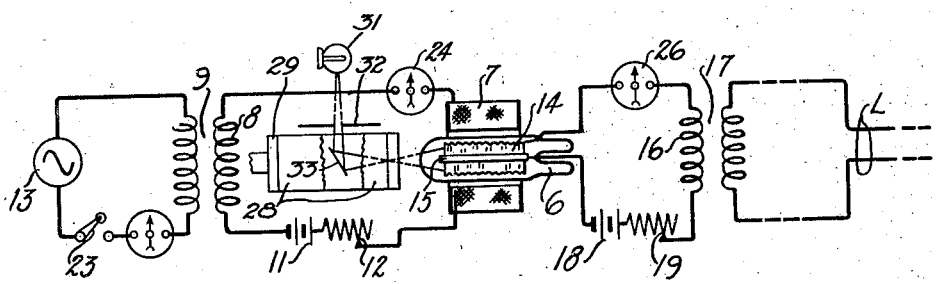
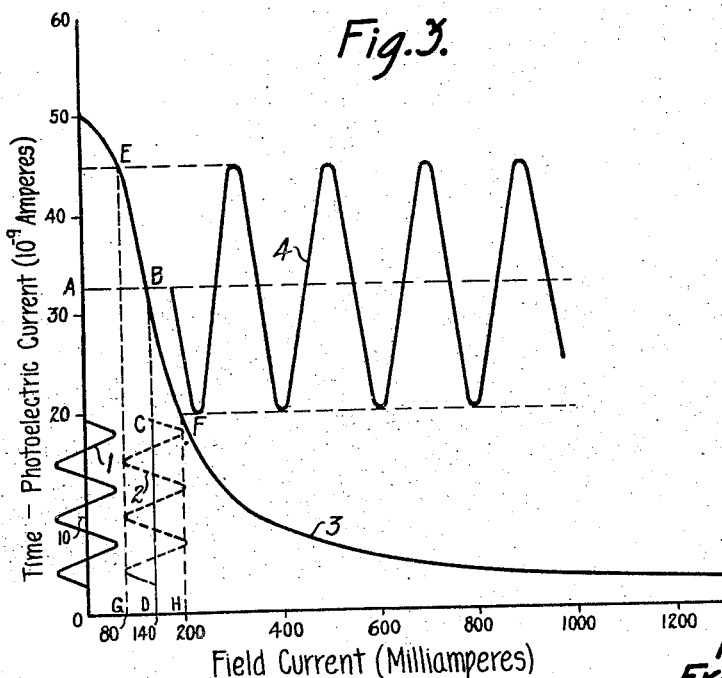
Inventor:
Frank Gray
by E. W. Adams Atty Patented Feb. 14, 1928.

1,658,843

UNITED STATES PATENT OFFICE.

FRANK GRAY, OF NEW YORK, N. Y., ASSIGNOR TO BELL TELEPHONE LABORATORIES, INCORPORATED, OF NEW YORK, N. Y., A CORPORATION OF NEW YORK.

MODULATING SYSTEM.

Application filed October 6, 1925. Serial No. 60,713. REISSUED

This invention relates to modulating systems and more particularly to the method and means for modulating a carrier current by means of light variations.

The invention has for its object to provide a more efficient system of modulating a carrier signaling current by means of light signals.

A feature of the invention relates to the method of producing a photoelectric current of an alternating character.

Another feature of the invention relates to the novel combination of a photoelectric cell with circuits and apparatus whereby, due to the varying characteristics of the cell, light signals directly modulate a carrier signaling current.

Other features and advantages which are inherent in the invention while not specifically enumerated will be revealed upon a consideration of the description given hereinafter.

Fig. 1 of the drawing shows a photoelectric cell of special construction.

Fig. 2 shows the cell of Fig. 1 employed as a modulator of an alternating current.

Fig. 3 illustrates curves showing the relation between the external field current and the current through the photoelectric cell.

Fig. 4 is a cross section of the cell shown in Fig. 1.

When the light sensitive element of a photoelectric cell is subjected to light rays, it is known that negative electrons are emitted with a velocity which is a function of the potential applied to the anode, or in other words this velocity is a function of the strength of field between the anode and cathode. If these discharged electrons and the ions produced by collision are then subjected to the action of an external magnetic field at right angles to their direction of motion, the number of such electrons or ions reaching the electrodes is therefore materially reduced. Thus, when a photoelectric cell is subjected to a magnetizing field in the proper direction, the value of the photoelectric current flowing through the cell is determined not only by the intensity of illumination of the light sensitive cathode but also by the strength of the external magnetic field. When the current for providing the magnetic field is alternating in character and of a fixed amplitude, the output of the photoelectric cell is also a corresponding alternating current of the same frequency but of an amplitude depending upon the intensity of the light incident upon the cathode.

One convenient form of construction of a photoelectric cell to be employed according to the present invention is illustrated in Fig. 1 of the drawing. This cell comprises a glass vessel 1, either evacuated or filled with an inert gas, which is cylindrical in shape. Suitably supported within the vessel are the anode and cathode 2 and 3, respectively. The cathode 3, as shown in Fig. 4, is cylindrical and may be of any suitable material, preferably metal. The cathode is coated with an appropriate substance which under the action of light emits photoelectrons. The composition of this substance and the manner of coating the cathode surface do not form features of the present invention. Accordingly, any of the hydrides of the alkali metals may be employed as the light sensitive coating, which may be applied in any well known manner; or the cathode may consist of a photo-sensitive metal coated directly onto the glass walls of the vessel. The anode 2 is a metallic rod and is mounted concentrically with regard to the cathode 3. Suitable conductors 4 and 5 are sealed-in through the walls of the glass vessel, to provide electrical connections to the electrodes.

Referring to Fig. 2, a description will now be given of one method of incorporating a cell, such as shown in Fig. 1, in a signaling circuit to modulate the signaling current. For this purpose, the cell 6 is surrounded by a magnetizing coil 7 which is connected in series with the secondary winding 8 of a transformer 9, and in series with the biasing battery 11 and the variable resistance 12. The purpose of the battery 11 and the resistance 12 will be described hereinafter. The primary winding of transformer 9 is connected to a source of alternating signaling current 13, represented schematically. The cathode 14 and the anode 15 are connected in series with the primary winding 16 of an output transformer 17, and in series with battery 18 and variable resistance 19. The secondary winding of transformer 17 may then be connected through a suitable amplifying device to the signaling line L. Should the line L be the usual telephone line with its associated equipment, the source 13 may be such as to generate a carrier current of the order of voice frequency. In this case, the field winding 7 may be a high impedance, low current winding, and may be provided with an iron core.

The system disclosed in Fig. 2 is adjusted in the following manner:

A predetermined amount of light, corresponding to the maximum exposure of cell 6 under signaling conditions, is allowed to impinge upon the cathode 14 whereby a photoelectric current of say $50 \times 10^{-9}$ amperes is produced, as indicated in Fig. 3. With switch 23 open resistance 12 is adjusted until the meter 24 registers 140 milliamperes, as indicated by the abscissa AB of Fig. 3, thus giving a photoelectric current DB as registered by meter 26. Switch 23 is then closed and alternating current is applied to the field winding. It is to be noted that the current from source 13 flowing through the secondary winding of transformer 9 is represented by the curve 1 of Fig. 3, and the direct current component flowing through this same winding is represented by the curve CD of Fig. 3. The resultant current flowing through the secondary winding of transformer 9 is therefore represented by the dotted curve 2. It will be noted that this current varies between the limits 80 and 200 milliamperes respectively. It will also be observed that this current is of substantially the same wave shape as that delivered by the source 13.

The circuits are now in readiness for the reception of light signals which may be controlled by the varying transparency of an exposed film or in any other manner suitable for signaling by light rays of varying intensity.

Curve 3 of Fig. 3 shows the manner in which the photoelectric current through the cell varies with different values of current through the field 7 and with a given intensity of light incident upon the cathode 14. It will be noted that the portion EF of curve 3 may for all practical purposes be considered as linear in character. Consequently, should a field current represented by curve 2 be applied to the winding 7, the resultant photoelectric current will vary according to the portion EF of curve 3. The amplitude of this current may thereupon be changed by the intensity of light rays incident upon cathode 14.

When the cell is to be employed for modulating a carrier current for picture transmission, the picture in the form of a transparent film 28 is wrapped around the cylindrical glass drum 29. Drum 29 is suitably connected to a driving shaft which imparts a rotational movement to said drum which is mounted in threaded supports to also provide a longitudinal movement. As a result of this longitudinal and rotational movement, the picture film is scanned in a continuous helical path. The light from the source 31 passes through the opening in baffle plate 32 and thence through the picture film and the transparent drum. This light is then reflected by a suitable reflecting system represented by mirror 33, and appropriately focused upon the cathode 4 of cell 6. When the picture is to be transmitted, drum 29 is started in rotation and the cathode 14 is variably exposed to light from the source 31 in accordance with the degrees of transparency of film 28. This varying quantity of light therefore correspondingly modulates the amplitude of the alternating current flowing through the transformer 17.

While in the foregoing description the invention has been shown as applied to a picture transmission system, it is understood that it may be applied to any system wherein light signals are to be translated into electrical signals. Accordingly, the invention is to be limited only by the appended claims.

What is claimed is:

1. Means for producing photo-electric current of alternating character comprising in combination a photoelectric cell, means for subjecting the cell to light variations, and means for subjecting the cell to an external alternating magnetic field.

2. In a system for modulating an alternating current by light rays, in combination a light sensitive device, means for subjecting the light sensitive device to light rays to produce photoelectrons and gaseous ions, and means for producing an electromagnetic field exterior to said light sensitive device by means of the alternating current to be modulated.

3. In combination, a photo-electric cell, a source of light, means for producing in said cell under control of light from said source a photo-electric current with a rectilinear characteristic, a source of alternating current, and means energized by said alternating current for changing said linear photo-electric current to a photo-electric current having a wave shape substantially similar to that of said alternating current.

4. In combination, a source of light, a photo-electric cell having an anode and a light sensitive cathode, means including said light source and a magnetizing coil around said cell for controlling the amplitude of the current through said cell.

5. In combination, a photo-electric cell, and means for setting up a magnetic field in said cell with a component perpendicular to a path taken by electrons in the cell when said field is zero, to control the impedance of said cell.

6. In combination, a photo-electric cell having an anode and a cathode and being filled with an inert gas, a source of light for causing the emission of electrons from said cathode, said electrons producing gaseous ions by collision and having a velocity determined by the potential of said anode, and means external to said cell for producing an alternating magnetic field to vary the direction and velocity of said electrons and said ions.

7. In combination, a photo-electric cell, a source of alternating signaling current, and means for producing a photo-electric current through said cell of the same wave shape and frequency as said alternating current, said means comprising a magnetizing coil energized by said alternating current.

8. In combination, a photo-electric cell, a source of alternating signaling current, and means for producing an alternating photo-electric current through said cell, said means comprising a high impedance field coil external to said cell and adapted to be energized by said alternating current.

In witness whereof, I hereunto subscribe my name this 1st day of October, A. D. 1925.

FRANK GRAY.